(12) United States Patent
Sedlacek et al.

(10) Patent No.: US 9,526,119 B2
(45) Date of Patent: Dec. 20, 2016

(54) METHODS AND APPARATUS FOR MULTIPLE DATA PACKET CONNECTIONS

(75) Inventors: Ivo Sedlacek, Landskrona (SE); Peter Hedman, Helsingborg (SE); Zu Qiang, Kirkland, CA (US); Dinand Roeland, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1085 days.

(21) Appl. No.: 13/532,317

(22) Filed: Jun. 25, 2012

(65) Prior Publication Data

US 2013/0005332 A1    Jan. 3, 2013

Related U.S. Application Data (60) Provisional application No. 61/502,459, filed on Jun. 29, 2011.

(51) Int. Cl.

| | | |
|---|---|---|
| *H04W 4/00* | (2009.01) | |
| *H04W 76/02* | (2009.01) | |
| *H04W 12/06* | (2009.01) | |
| *H04L 29/06* | (2006.01) | |
| *H04W 48/00* | (2009.01) | |
| *H04W 92/02* | (2009.01) | |

(52) U.S. Cl.
CPC .......... *H04W 76/02* (2013.01); *H04L 63/0892* (2013.01); *H04W 12/06* (2013.01); *H04W 48/17* (2013.01); *H04W 92/02* (2013.01)

(58) Field of Classification Search
CPC .. H04W 76/02; H04W 63/0892; H04W 12/06; H04W 48/17

USPC .................................. 455/426.1; 370/338
See application file for complete search history.

(56) References Cited

U.S. PATENT DOCUMENTS

| | | | |
|---|---|---|---|
| 2011/0035787 A1 | 2/2011 | Naslund et al. | |
| 2011/0171953 A1* | 7/2011 | Faccin | H04W 48/08 455/426.1 |
| 2011/0200007 A1 | 8/2011 | Qiang | |
| 2011/0271117 A1 | 11/2011 | Qiang | |
| 2014/0101726 A1* | 4/2014 | Gupta | H04N 21/2365 726/4 |

OTHER PUBLICATIONS

3GPP TR 23.852, Technical Specification Group Services and System Aspects; Study on S2a Mobility based on GTP & WLAN access to EPC (SaMOG); Stage 2, Release 11, Dec. 2011.

(Continued)

*Primary Examiner* — Marcos Batista
(74) *Attorney, Agent, or Firm* — Patent Portfolio Builders PLLC (57) ABSTRACT

A network can handle access attempts by a mix of user equipments (UEs) that do and do not support multiple packet data network connections and do and do not support Internet Protocol version 6 (IPv6) and access attempts from networks that do and do not support multiple PDN connections. A method of operating a Trusted Non-3GPP Access network with a 3GPP network involves an authentication, authorization, and accounting (AAA) proxy in the Trusted Non-3GPP Access network and a UE that supports multiple PDN connections, with the AAA proxy sending an indication to the UE that the network supports multiple PDN connections.

15 Claims, 6 Drawing Sheets

(56) References Cited

OTHER PUBLICATIONS

3GPP TS 23.402 V11.2.0, Technical Specification Group Services and System Aspects; Architecture enhancements for non-3GPP accesses, Release 11, Mar. 2012.
3GPP TR 23.852 V0.2.0,Technical Specification Group Services and System Aspects; Study on S2a Mobility based on GTP & WLAN access to EPC (SaMOG); Stage 2, Release 11, May 2011.
3GPP TS 23.402 V10.4.0, Technical Specification Group Services and System Aspects; Architecture enhancements for non-3GPP accesses, Release 10, Jun. 2011.
PCT Search Report, mailed Oct. 4, 2012, in connection with International Application No. PCT/EP2012/062541.
PCT Written Opinion, mailed Oct. 4, 2012, in connection with International Application No. PCT/EP2012/062541.
IEEE, Part 11: Wireless LAN Medium Access Control (MAC) and Physical Layer (PHY) Specifications, Amendment 9: Interworking with External Networks, IEEE Std 802.11u-2011, Feb. 25, 2011, pp. 1-208.
IEEE, Part 11: Wireless LAN Medium Access Control (MAC) and Physical Layer (PHY) Specifications, IEEE Std 802.11-2012, Mar. 29, 2012, pp. 1-2793.

\* cited by examiner

METHODS AND APPARATUS FOR MULTIPLE DATA PACKET CONNECTIONS

This application claims the benefit of the filing date of U.S. Provisional Patent Application No. 61/502,459 that was filed on Jun. 29, 2011, and that is incorporated here by reference.

TECHNICAL FIELD

This invention relates to telecommunication networks and more particularly to interfaces between telecommunication networks.

BACKGROUND

User equipments (UEs), such as smartphones, computers, etc., have become more capable of accessing the Internet and other data networks that communicate using data packets according to the internet protocol (IP). Thus, the Third Generation Partnership Project (3GPP) has begun considering specifications that define how a 3GPP-compliant UE can attach to a 3GPP-compliant evolved packet system (EPS) through a non-3GPP access network and can move between a 3GPP, or cellular, access network and a non-3GPP, or non-cellular, access network connected to an EPS. An EPS typically includes an evolved packet core (EPC) network and an evolved radio access network (RAN). It will be understood that the terms "cellular" and "non-cellular" as used in this application refer to whether or not a network is governed by 3GPP technical specifications, and not necessarily to any geographic characteristics of the radio coverage of the network.

3GPP categorizes non-3GPP access networks as either "non-trusted" or "trusted", with a non-trusted non-3GPP access network currently being one that has an IP-security (IPsec) tunnel established between the UE and the EPS, and a trusted non-3GPP access network currently being one that does not have an established IPsec tunnel. A trusted non-3GPP access network does not have an established IPsec tunnel because the non-3GPP access network supports sufficient security mechanisms on the access layers. The interface and reference point between a non-trusted non-3GPP access network and a 3GPP EPC network is called S2b, and the interface and reference point between a trusted non-3GPP access network and a 3GPP EPC network is called S2a.

The development of the S2a interface is currently described in 3GPP Technical Report (TR) 23.852, Study on S2a Mobility based on GTP and WLAN Access to EPC (SaMOG), Stage 2 (Release 11). 3GPP TR 23.852 is intended to describe necessary stage 2 message flows to support S2a based on the general packet radio service (CPRS) tunneling protocol (GTP), and mobility between GTP-S5/S8 and GTP-S2a, as well as support for access to the EPS through S2a from a wireless local area network (WLAN), e.g., a WLAN compliant with the IEEE 802.11 standards. It will be understood of course that the S2a interface applies to the proxy mobile IP (PMIP) protocol as well as to the GTP, as described in Clause 16 of 3GPP TS 23.402 v11.2.0, Architecture Enhancements for Non-3GPP Accesses (Release 11) (March 2012), for example.

For UE access through a WLAN to the EPS through S2a, it is currently assumed that the UE and the EPS mutually authenticate through the WLAN, with such authentication specified in Clause 4.9.1 of 3GPP TS 23.402, that the confidentiality and integrity of UE traffic over the WLAN air link can be protected as defined by IEEE 802.11, and that there is a point-to-point link between the UE and a non-3GPP access network GTP peer. WLAN security mechanisms provide the WLAN trusted access to the EPS, e.g., using extensible authentication protocol (EAP) and IEEE 801.1X messaging over the WLAN air link.

Figure 1A:
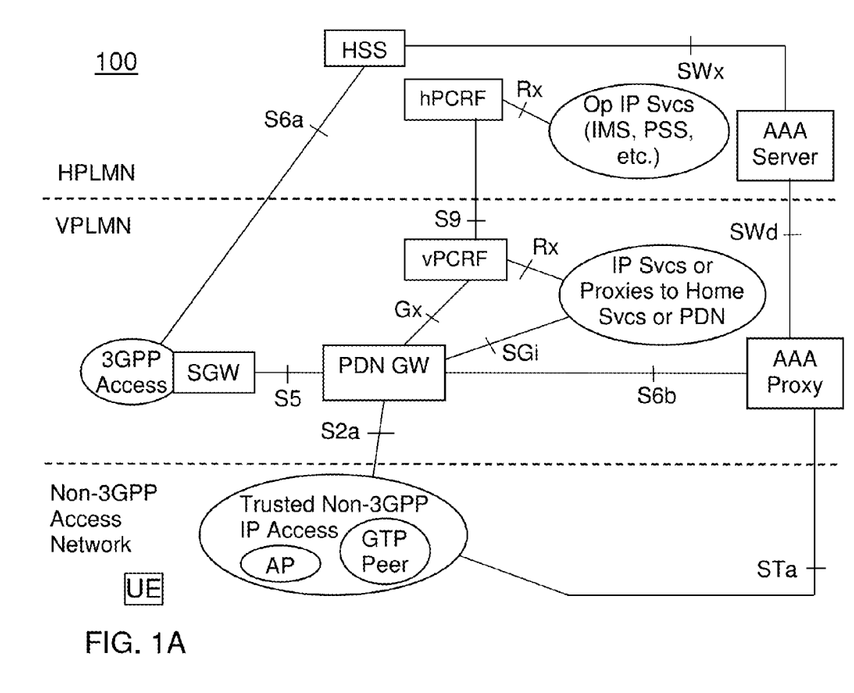
FIG. 1A illustrates an example architecture of a conventional network for roaming access by a user equipment to an evolved packet system through a GTP-based S2a interface.
Figure 1B:
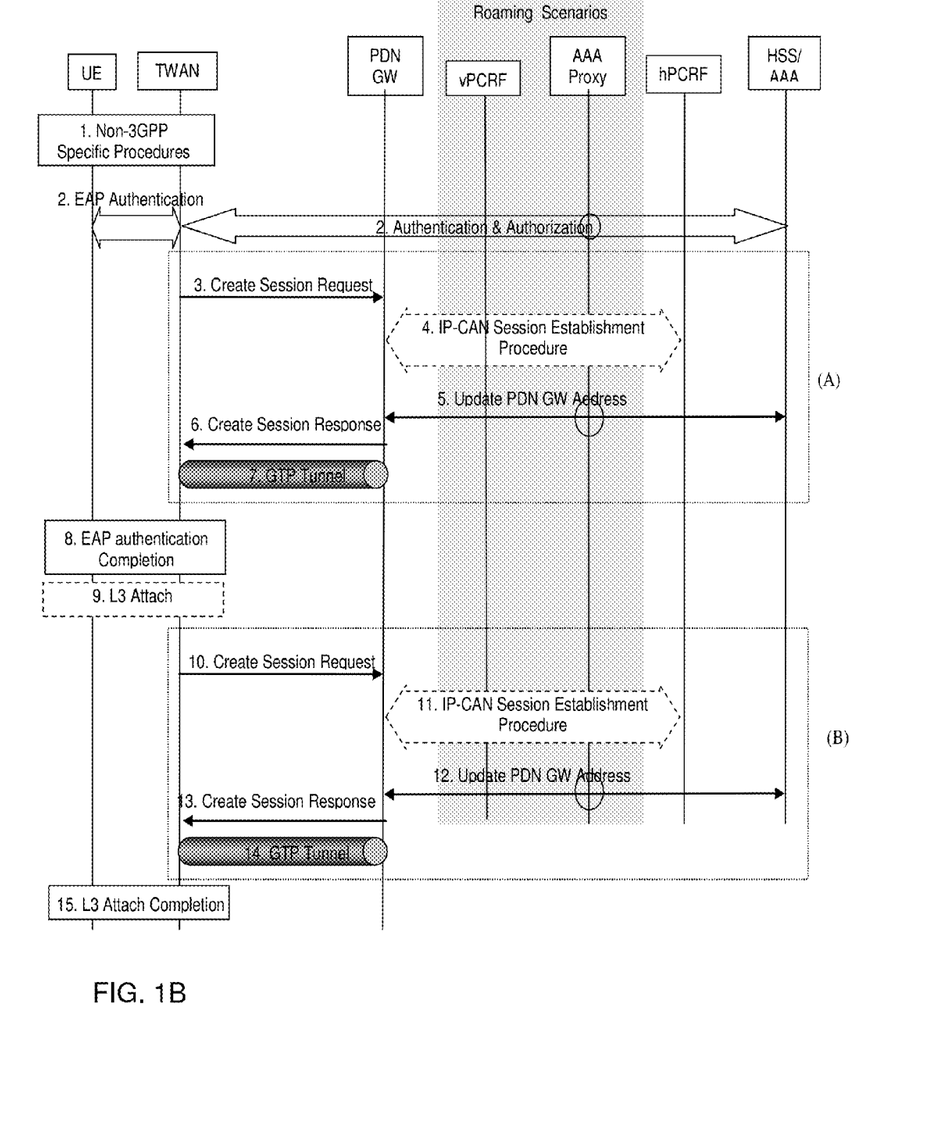
FIG. 1B illustrates the conventional network of FIG. 1A and a message flow for initial attachment over the GTP-S2a interface.

FIG. 1A illustrates an example architecture of a network 100 for roaming EPS access through GTP-based S5 and S2a, and FIG. 1B illustrates the network 100 and a general message flow for initial attachment with network-based mobility management over GTP-S2a. FIG. 1A corresponds to FIG. 16.1.1-3 and FIG. 1B corresponds to FIG. 16.2.1-1 of Clause 16 of 3GPP TS 23.402.

As shown in FIGS. 1A, 1B, the network 100 includes a Home Public Land Mobile Network (HPLMN) and a Visited PLMN (VPLMN) that together can be called a 3GPP Network, a user equipment (UE), and a Non-3GPP Access Network. The Non-3GPP Access Network includes a Trusted Non-3GPP Access Network portion that includes an Access Point (AP) and a GTP Peer, and the AP can contain an access network query protocol (ANQP) server supporting communication compliant with the IEEE 802.11u specification. In FIG. 1B, the Trusted Non-3GPP Access Network portion is indicated as a Trusted WLAN Access Network (TWAN). The VPLMN typically includes a 3GPP Access portion, a Serving Gateway (SGW), a PDN gateway (GW), an authentication, authorization, and accounting (AAA) Proxy server, a visitor policy and charging rules function (vPCRF), and a cloud of IP services provided by the VPLMN and Proxy servers to IP services provided by the HPLMN. As the network 100 is depicted in FIG. 1A, the SGW is not used when non-3GPP access is used. The HPLMN includes a Home Subscriber System (HSS), a AAA Server, a home PCRF (hPCRF), and a cloud of IP services provided by the operator of the HPLMN. Interfaces between entities depicted in FIG. 1A are identified by names specified by 3GPP. It will be understood that the VPLMN is included in the 3GPP network only when the UE roams out of its HPLMN, and so the VPLMN is shown in FIG. 1A for completeness.

It will be noted that the parameters signaled in the GTP-S2a message flow are still undergoing standardization (see, e.g., 3GPP TR 23.852). It will also be noted that a respective point-to-point link between each UE and a GTP Peer in the Trusted Non-3GPP Access network is assumed, and that the Trusted Non-3GPP Access network does not do any routing of UE traffic between an AP, such as a Wireless Fidelity (WiFi) AP, in the Trusted Non-3GPP Access network and a GTP Peer. The WiFi AP applies upstream and downstream forced-forwarding between the UE's WiFi air link and the link between the WiFi AP and the GTP Peer, and the GTP Peer applies upstream and downstream forced-forwarding between the WiFi AP-GTP Peer link and the UE's GTP tunnel between the GTP Peer and the PDN GW.

Aspects of communication in the network 100 are described in, for example, U.S. Patent Application Publications No. 2011/0035787 by M. Naslund et al. for "Access through Non-3GPP Access Networks"; No. 20110200007 by Z. Qiang for "Interworking between Systems Using Different IP Mobility Management Protocols"; and No. 2011/0271117 by Z. Qiang for "User Equipment (UE), Home Agent Node (HA), Methods, and Telecommunications System for Home Network Prefix (HNP) Assignment".

As currently specified by 3GPP in 3GPP TS 23.402, when a UE accesses the EPS through a Trusted Non-3GPP Access network using the S2a interface and EAP Authentication successfully completes, the UE gets one IP address and establishes one PDN connection using a default APN where handover is not performed. The trigger to set up the S2a GTP tunnel is either successful authentication (steps 3-7 in block A in FIG. 1B) or an explicit layer-3 (L3) attach request from the UE (steps 10-14 in block B in FIG. 1B). Each PDN connection is represented by an IP address (or IP prefix) assigned to the UE by a DHCP server. Such operation can be considered overly restrictive because when the UE accesses the EPS using a 3GPP network, the UE can establish multiple PDN connections in parallel, and when the UE accesses the EPS using an S2b interface (not shown), the UE can also establish multiple PDN connections in parallel.

A future UE using the S2a interface may wish to establish multiple PDN connections, and/or to establish a PDN connection using an APN other than the default APN, and/or to handover an existing PDN connection. Collectively, those three features are called advanced S2a-WLAN (advWLAN) features in this application. Such a UE may not wish to establish and be charged for one PDN connection with a default APN without handover as required by 3GPP Release 11. Nevertheless, a UE currently is not aware of network capabilities regarding advWLAN feature support, and so just by performing successful EAP Authentication, a UE may unintentionally establish and be charged for the one PDN connection with a default APN without handover, which is established by a Trusted Non-3GPP Access Network compliant with 3GPP Release 11.

Of course, a network can expect access attempts by a mix of UEs that one or more advWLAN features (which will often be newer UEs), and UEs that do not support those features (which will often be legacy UEs). Moreover, accesses can even be attempted with a mix of networks that support advWLAN features, and networks that do not support those features. It is desirable for a network to provide access and efficient service to both types of UEs, and it is also desirable for a UE to avoid establishing and being charged for one PDN connection with a default APN without handover just by performing successful EAP Authentication.

SUMMARY

Hence there is a need for methods and apparatus that enable a network to handle access attempts by a mix of UEs that do and do not support multiple PDN connections, PDN connections using APNs other than a default APN, and/or handover of existing PDN connections, and access attempts to networks that do and do not support multiple PDN connections, PDN connections using APNs other than a default APN, and/or handover of existing PDN connections.

In accordance with aspects of this invention, there is provided a method of operating a trusted non-cellular, or non-3GPP, access network with a cellular, or 3GPP, access network. The trusted non-cellular access network includes a trusted non-cellular access network entity; the cellular access network includes a packet data network (PDN) gateway (GW) and a cellular authentication, authorization, and accounting (AAA) server; and a user equipment (UE) supports multiple PDN connections, PDN connection using an access point name (APN) other than a default APN, and handover of an existing PDN connection. The method includes sending, from the trusted non-cellular access network entity to the UE, an indication whether the trusted non-cellular access network supports at least one of a PDN connection using an APN other than the default APN, handover of an existing PDN connection, and multiple PDN connections.

Also in accordance with aspects of this invention, there is provided an arrangement for operating a trusted non-cellular access network with a cellular access network. The trusted non-cellular access network includes a trusted non-cellular access network entity; the cellular access network includes a packet data network (PDN) gateway (GW) and a cellular authentication, authorization, and accounting (AAA) server; and a user equipment (UE) supports multiple PDN connections, PDN connection using an access point name (APN) other than a default APN, and handover of an existing PDN connection. The arrangement includes at least one electronic processor configured for sending, from the trusted non-cellular access network entity to the UE, an indication whether the trusted non-cellular access network supports at least one of a PDN connection using an APN other than the default APN, handover of an existing PDN connection, and multiple PDN connections.

Also in accordance with aspects of this invention, there is provided a non-transitory computer-readable medium having instructions that, when executed by a computer, cause the computer to carry out a method of operating a trusted non-cellular access network with a cellular access network. The trusted non-cellular access network includes a trusted non-cellular access network entity; the cellular access network includes a packet data network (PDN) gateway (GW) and a cellular authentication, authorization, and accounting (AAA) server; and a user equipment (UE) supports multiple PDN connections, PDN connection using an access point name (APN) other than a default APN, and handover of an existing PDN connection. The method includes sending, from the trusted non-cellular access network entity to the UE, an indication whether the trusted non-cellular access network supports at least one of a PDN connection using an APN other than the default APN, handover of an existing PDN connection, and multiple PDN connections.

BRIEF DESCRIPTION OF THE DRAWINGS

The several features, objects, and advantages of this invention will become apparent by reading this description in conjunction with the drawings, in which like elements are identified by like reference characters and in which.

DETAILED DESCRIPTION

It will be understood that this application focusses on 3GPP networks for convenience, and that the principles of this invention can be applied in other communication networks.

Figure 2A:
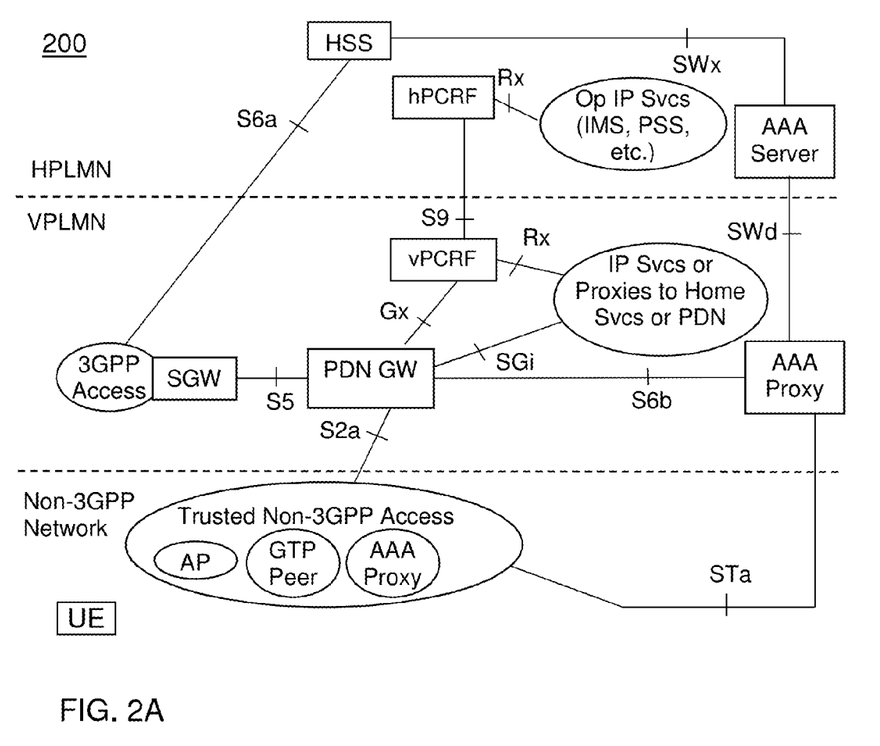
FIG. 2A illustrates an example architecture of a network for roaming access by a user equipment to an evolved packet system through a GTP-based S2a interface in accordance with this invention.
Figure 2B:
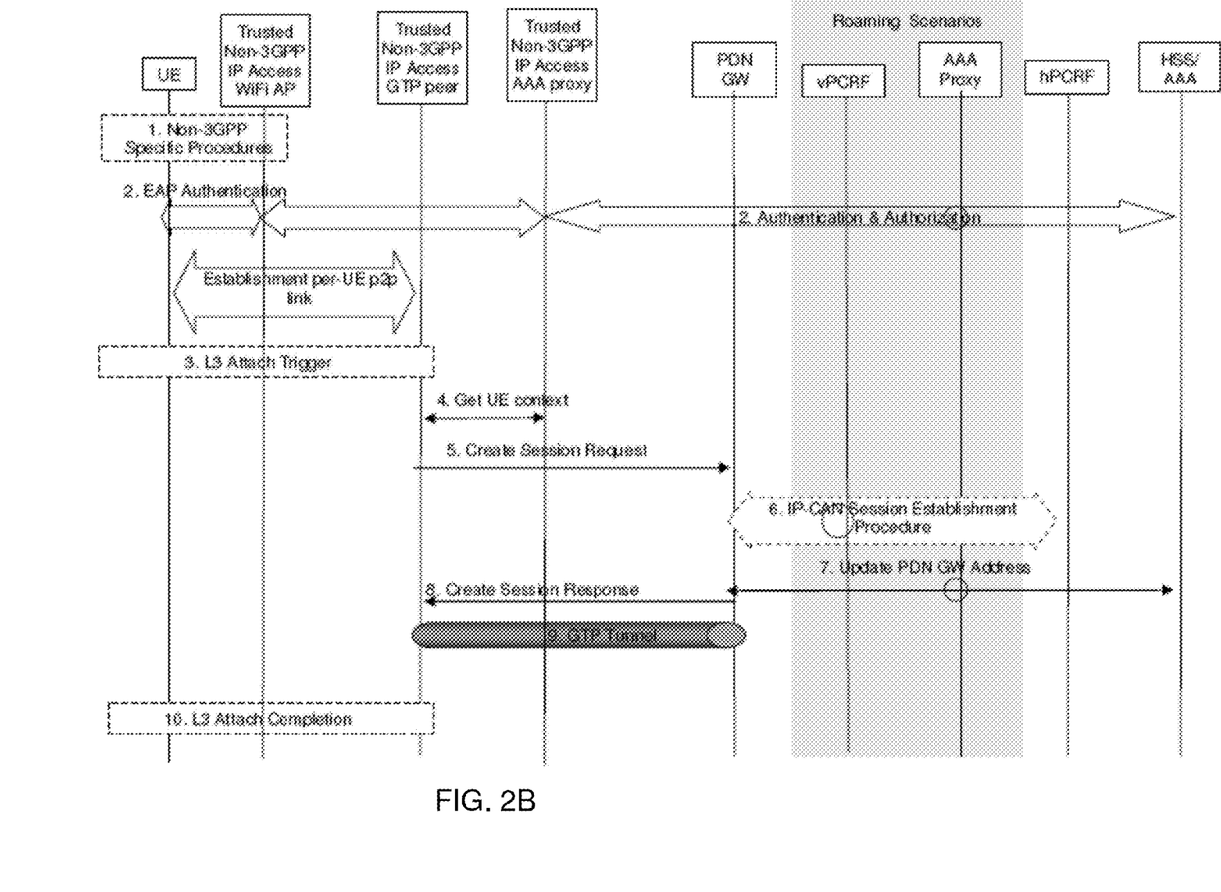
FIG. 2B illustrates the network of FIG. 2A and an example of a message flow for initial attachment over the GTP-S2a interface in accordance with the invention.

FIG. 2A illustrates an example architecture of a network 200 for EPS access through GTP-S2a in accordance with the invention, and FIG. 2B illustrates the example network 200 and an example of a message flow for initial attachment over GTP-S2a in accordance with the invention. Compared with the network 100 depicted in FIGS. 1A, 1B, the network 200 in FIGS. 2A, 2B includes a AAA Proxy in the Trusted Non-3GPP Access network, or TWAN, that is configured for a number of advantageous changes to the message flows in different embodiments of this invention. Except for inventive differences that are described in more detail below, the message flow in FIG. 2B is substantially the same as the message flow in FIG. 1B when steps 10-14 in block B are used.

Embodiment 1

The AAA Proxy in the Trusted Non-3GPP Access network is configured to send to a UE, e.g., during the EAP Authentication process in step 2 in FIG. 2B, one or more messages that indicate support for requests for advWLAN features, e.g., multiple PDN connections, PDN connections using APNs other than the default APN, and handover of existing PDN connections. The artisan will understand that the AAA Proxy can be configured to send one or more messages that separately indicate support for requests for multiple PDN connections, requests for PDN connections using APNs other than the default APN, and/or requests for handover of existing PDN connections.

The AAA Proxy, like the other entities in the networks depicted in FIGS. 1 and 2, is typically implemented as a suitably programmed electronic computer or set of electronic processors, and/or as suitably configured logic circuits and other circuits, and so the AAA Proxy can be configured to send the messages described above by suitable programming.

If the UE also supports one or more advWLAN features, then the UE can take one or more of the following actions:
  A) if the UE receives the support indication message(s) sent by the AAA Proxy, either directly or indirectly from the AAA Proxy, and the UE intends to request one or more advWLAN features, then the UE sends one or more appropriate messages setting up the PDN connection(s). For example, the UE can send one or more DHCP requests with or without APN to request setup of a PDN connection as shown in FIG. 2B;
  B) if the UE does not receive the support indication message(s) and the UE intends to request one or more advWLAN features, or if the UE receives the support indication message(s) and the UE intends to request a feature that is not supported by the Trusted Non-3GPP Access network, then the UE aborts, or interrupts, the authentication procedure (step 2 in FIG. 2B);
  C) if the UE does not receive the support indication message(s) and the UE prefers multiple PDN connections and/or a PDN connection using an APN other than the default APN and/or handover of an existing PDN connection, or if the UE receives the support indication message(s) and the UE prefers a feature that is not supported by the Trusted Non-3GPP Access network, then the UE chooses either to abort, or interrupt, the authentication process (e.g., step 2 in FIG. 2B), or to complete the authentication process (e.g., step 2 in FIG. 2B) and accept that the network does not support the requested feature(s).

Embodiment 1 is advantageous in that the network 200 is able to provide services to UEs that support advWLAN features, e.g., multiple PDN connections, PDN connections using APNs other than the default APN, and/or handover of existing PDN connections, and to provide services to UEs that do not support those features without establishing and charging for unnecessary PDN connections. In addition, a UE supporting one or more advWLAN features and intending to request one or more of those features is able to determine that the network is unable to fulfil its intended request, and so the UE is able to prevent set up of a PDN connection using the default APN and to choose to permit the set up to occur.

Embodiment 2

1) The AAA Proxy in the Trusted Non-3GPP Access network is configured to send an indication of advWLAN feature support to the UE, e.g., during the EAP Authentication process in Step 2 in FIG. 2B.

2) If the UE supports advWLAN features:
  A) if the UE receives the advWLAN feature support indication, then the UE does not send a RS but sends only a DHCP request with or without an APN to request set up of a PDN connection as shown in FIG. 2B.
  B) if the UE does not receive the advWLAN feature indication and the UE intends to request a PDN connection using its default APN, then the UE acts as a UE without advWLAN features support; and
  C) if the UE does not receive the advWLAN features support indication and the UE intends to request a PDN connection using an APN other than the default APN, then the UE aborts the authentication process, because the service is not available due to the network's inability to make a PDN connection using APNs other than the default APN.

3) If the UE does not support advWLAN features, then the UE sends a RS or a DHCP request without an included APN or can send nothing.

4) A Trusted Non-3GPP Access GTP peer with advWLAN feature support interprets receiving an RS (which will be received from only a UE not supporting advWLAN features) as a PDN connection request using the default APN.

5) The Trusted Non-3GPP Access network GTP peer with advWLAN feature support interprets receiving no RS and no DHCP request within a predetermined time period after 1) as a PDN connection request using the default APN.

6) The Trusted Non-3GPP Access network GTP peer with advWLAN features support handles the DHCP request as shown in FIG. 2B.

Embodiment 2 has advantages similar to those of Embodiment 1. It will be noted that differences between the embodiments relate mainly to handling UEs that do not support advWLAN features.

Embodiment 3

1) The UE sends an indication that it supports advWLAN features, e.g., as part of the EAP Authentication process in Step 2 in FIG. 2B. The UE's preferred default APN can be included in the EAP messages.

2) The AAA Proxy in the Trusted Non-3GPP Access responds with an indication of advWLAN feature support that includes a network preference with respect to those features, e.g., as part of the EAP Authentication process in Step 2 in FIG. 2B. The network preference can be based on one or more of the UE's subscription, the network's capability, and the operator's policy.

3) If the received network preference indicates that advWLAN features are preferred, the UE proceeds according to DHCPv6 (e.g., sending a DHCPv6 request) starting at Step 3 in FIG. 2B.

4) If the received network preference indicates that advWLAN features are not preferred, the UE sends a RS at Step 3 in FIG. 2B, which the network interprets as a request for a PDN connection using the default APN.

Figure 3:
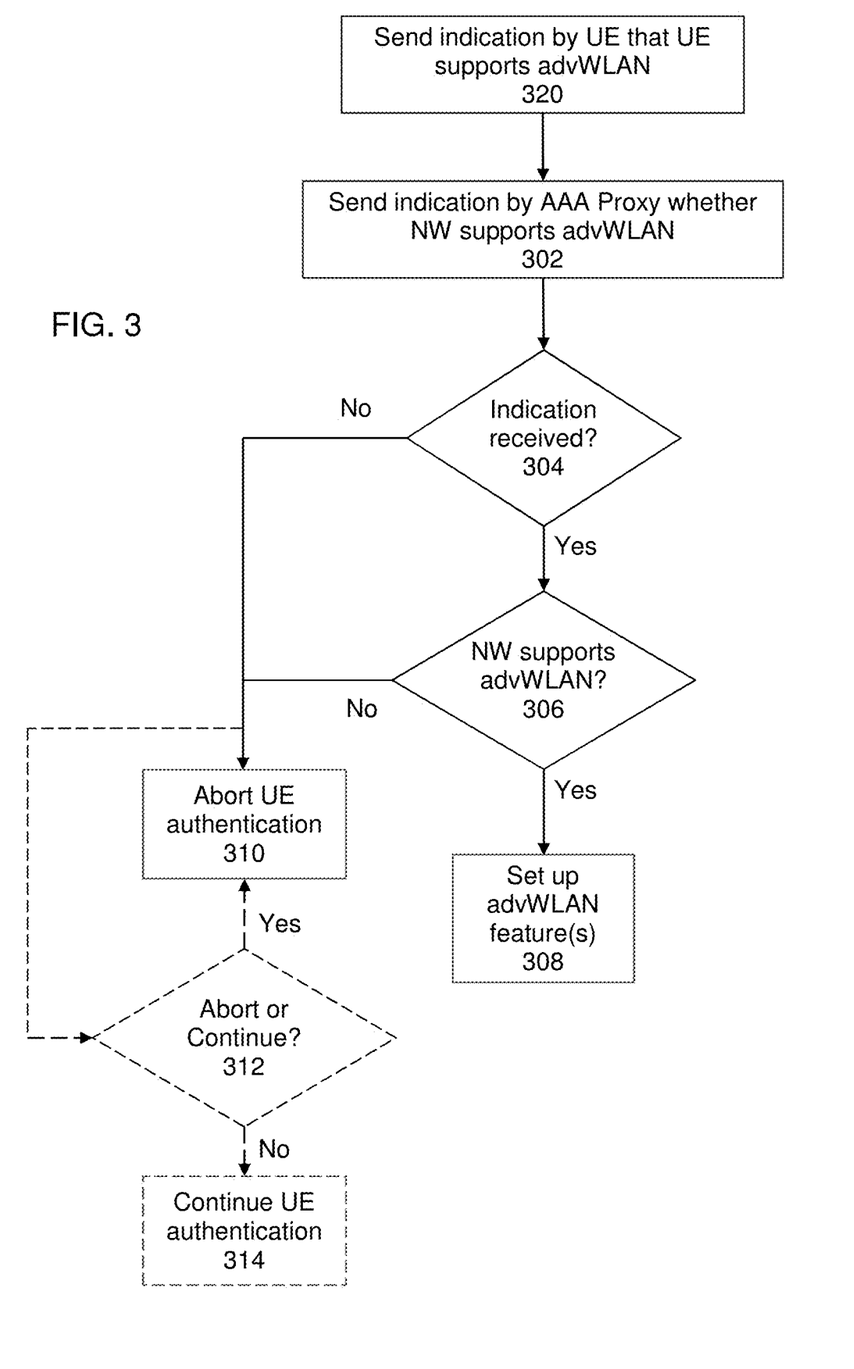
FIG. 3 is a flowchart that depicts examples of methods of operating in accordance with this invention.

FIG. 3 is a flowchart of a method of operating a Trusted Non-3GPP Access network, such as a Trusted WLAN, with a 3GPP network that reflects the above-described embodiments. The Trusted Non-3GPP Access network includes a AAA Proxy configured as described above, and the 3GPP network includes a PDN GW and 3GPP AAA server and a UE that supports one or more advWLAN features, e.g., multiple PDN connections, PDN connections using APNs other than the default APN, and/or handover of existing PDN connections.

In step 302, an indication is sent to the UE by or on behalf of the AAA Proxy that indicates whether the Trusted Non-3GPP Access network supports at least one of the advWLAN features, i.e., at least one of a PDN connection using an APN other than the default APN, handover of an existing PDN connection, and multiple PDN connections. If the UE receives the indication (Yes in step 304) and if the received indication indicates the network supports the one or more advWLAN features that the UE intends to request (Yes in step 306), then the UE sends (step 308) one or more appropriate messages for setting up the requested PDN connection(s) in the usual way, e.g., by DHCP request messages.

If the UE does not receive the indication from the AAA Proxy (No in step 304), or if the UE receives the indication and the received indication indicates the network does not support the advWLAN feature(s) that the UE intends to request (No in step 306), then the UE aborts, or terminates, the authentication procedure, such as EAP Authentication (step 310).

As an alternative indicated by the dashed lines, if the UE does not receive the indication from the AAA Proxy (No in step 304), or if the UE receives the indication and the received indication indicates the network does not support the advWLAN feature that the UE prefers (No in step 306), then the UE can choose (step 312) whether to abort the authentication procedure. If the UE chooses to abort (Yes in step 312), then the UE aborts the authentication procedure (step 310). If the UE chooses not to abort the authentication procedure (No in step 312), then the UE continues the authentication process (step 314), ignoring its preference and accepting the network's inability to support the UE's preferred advWLAN feature(s).

It will be observed that it is not always necessary to abort the authentication procedure if the UE cannot get the advWLAN feature(s) it wants because there can be cases when the UE prefers, or "wishes", to have a certain feature but can accept that the network cannot provide that feature. For example, a UE can move out from its LTE cell and enter a WLAN cell, with no other cells being available, and the UE can prefer a handover attach with IP address preservation, but the WLAN network does not support that feature. In that example, the UE can choose to ignore its preference, to continue the authentication, and to accept that the IP address is changed.

As described above, the indication can be included in the messages of the EAP Authentication procedure. The indication message or messages can also be provided in accordance with the IEEE 802.11u protocol as a response to an ANQP query, which is performed before authentication (step 2 in FIG. 2B). If the UE intends to request an advWLAN feature that is not supported by the Trusted Non-3GPP Access network as indicated by such messaging, the UE can simply not use the particular Trusted Non-3GPP Access network.

It will be understood that a rationale behind IEEE 802.11u is to let a device (e.g., a UE) query information about network services (in other words, features the network supports), and so before a UE starts the authentication process, the UE queries the WLAN access point for the network's capabilities. Based on the information received, the UE can then decide if it still wants to attach to that network. If so, it would do an "association" with the network according to IEEE 802.11 and start the authentication process. As noted in IEEE 802.11u, accessing information about network services before associating with the network can be beneficial. For example, it supports more informed decision making about an IEEE 802.11 infrastructure with which to associate, which is generally more efficient than requiring association before discovering the information and then deciding whether or not to stay associated. The UE or other device can query multiple networks in parallel, and information can be discovered about APs that are not part of the same administrative group as the AP with which the UE associates.

The above-described methods can be implemented in any telecommunication network complying with suitable communication standards and using suitable components, such as the network 200 illustrated in FIGS. 2A, 2B. Of course, it will be understood that the network 200 can include more than one UE and more than one of each of the other entities depicted in FIGS. 2A, 2B. It will also be understood that a UE can be any communication device, such as a mobile or landline telephone, computer, etc., and can include any suitable combination of hardware and/or software. Similarly, other entities, such as the AAA Proxy, can include any suitable combination of electronic circuit hardware and/or software.

Figure 4:
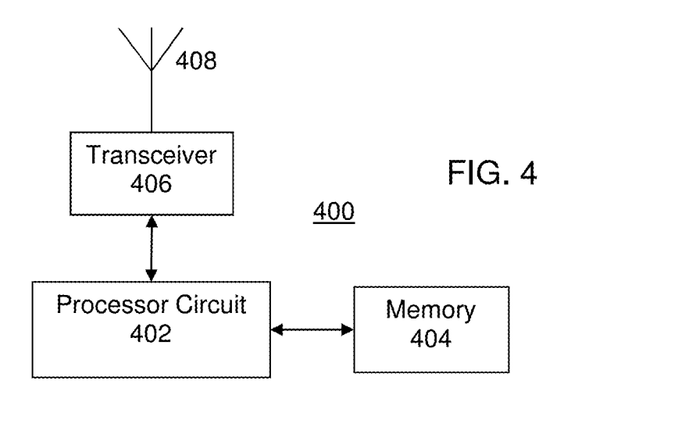
FIG. 4 is a block diagram of an example of a user equipment.

FIG. 4 is a block diagram of an example of a UE 400, showing at least one electronic processor circuit 402, an electronic memory circuit 404, a radio transceiver 406, and a radio antenna 408. Some or all of the functionalities described above as being provided by mobile communication devices or other forms of UE can be implemented by the processor's execution of program instructions stored on a computer-readable medium, such as the memory shown in FIG. 4. Alternative embodiments of the UE can include additional components beyond those shown in FIG. 4 that can be responsible for providing aspects of the UE's functionality, including any of the functionality described in this application and/or any functionality necessary to support the methods described in this application.

Figure 5:
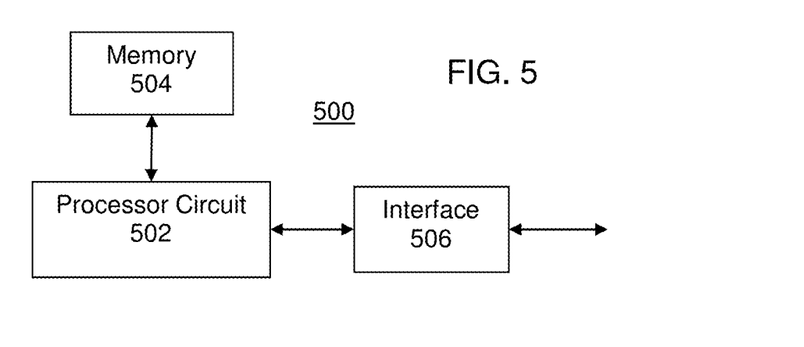
FIG. 5 is a block diagram of an example of an authentication, authorization, and accounting proxy.

FIG. 5 is a block diagram of an example of a AAA Proxy 500 in the Non-GPP Trusted Access network. The example AAA Proxy includes at least one electronic processor circuit 502, an electronic memory 504, and an interface 506 that are configured for sending and receiving messages, indications, and other information. Some or all of the functionalities described above as being provided by the AAA Proxy, or any of the other entities in the network 200, can be implemented by the processor 502's execution of program instructions stored on a computer-readable medium, such as the memory 504 shown in FIG. 5. Alternative embodiments of the AAA Proxy and of other network entities can include additional components beyond those shown in FIG. 5 that can be responsible for providing aspects of additional functionality, including any of the functionality described in this application and/or any functionality necessary to support the methods described in this application.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like. Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

It will be appreciated that procedures described above are carried out repetitively as necessary, for example, to respond to the time-varying nature of communication channels between transmitters and receivers. In addition, it will be understood that the methods and apparatus described here can be implemented in various system nodes.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless devices implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

What is claimed is:

1. A method of operating a trusted non-cellular access network with a cellular access network, wherein the trusted non-cellular access network includes a trusted non-cellular access network entity, the cellular access network includes a packet data network (PDN) gateway (GW) and a cellular authentication, authorization, and accounting (AAA) server, and a user equipment (UE) that supports multiple PDN connections, each PDN connection using an access point name (APN) other than a default APN, and handover of an existing PDN connection, the method comprising:
   sending, from the trusted non-cellular access network entity to the UE, an indication whether the trusted non-cellular access network supports at least one of a PDN connection using an APN other than the default APN, and handover of an existing PDN connection,
   wherein the trusted non-cellular access network entity is a AAA Proxy, the indication is sent during an extensible authentication protocol (EAP) authentication procedure, and the method further includes, if the UE does not receive the indication and if the UE prefers at least one of a PDN connection using an APN other than the default APN, handover of an existing PDN connection, and multiple PDN connections, choosing either to abort the EAP authentication procedure, or to complete the EAP authentication procedure and ignore the UE's preference for at least one of a PDN connection using an APN other than the default APN, handover of an existing PDN connection, and multiple PDN connections.

2. The method of claim 1, wherein the trusted non-cellular access network entity is a AAA Proxy, the indication is sent during an extensible authentication protocol (EAP) authentication procedure, and the method further includes, if the UE does not receive the indication and if the UE intends to request at least one of a PDN connection using an APN other than the default APN, handover of an existing PDN connection, and multiple PDN connections, aborting the EAP authentication procedure.

3. The method of claim 2, wherein the AAA Proxy includes the indication in an EAP message sent to the UE.

4. The method of claim 2, wherein the AAA proxy includes the indication in an AAA message sent with an EAP message to the AAA server, and the AAA server includes the indication in an EAP message sent to the UE.

5. The method of claim 1, wherein the trusted non-cellular access network is a Trusted Wireless Local Area Network Access Network (TWAN).

6. An arrangement for operating a trusted non-cellular access network with a cellular access network, wherein the trusted non-cellular access network includes a trusted non-cellular access network entity, the cellular access network includes a packet data network (PDN) gateway (GW) and a cellular authentication, authorization, and accounting (AAA) server, and a user equipment (UE) that supports multiple PDN connections, each PDN connection using an access point name (APN) other than a default APN, and handover of an existing PDN connection, the arrangement comprising:
   at least one electronic processor configured for sending, from the trusted non-cellular access network entity to the UE, an indication whether the trusted non-cellular access network supports at least one of a PDN connection using an APN other than the default APN, and handover of an existing PDN connection,
   wherein the trusted non-cellular access network entity is a AAA Proxy, the indication is sent during an extensible authentication protocol (EAP) authentication procedure, and the UE is configured for choosing, if the UE does not receive the indication and if the UE prefers at least one of a PDN connection using an APN other than the default APN, handover of an existing PDN connection, and multiple PDN connections, either to abort the EAP authentication procedure, or to complete the EAP authentication procedure and ignore the UE's preference for at least one of a PDN connection using an APN other than the default APN, handover of an existing PDN connection, and multiple PDN connections.

7. The arrangement of claim 6, wherein the trusted non-cellular access network entity is a AAA Proxy, the indication is sent during an extensible authentication protocol (EAP) authentication procedure, and the UE is further configured for aborting the EAP authentication procedure if the UE does not receive the indication and if the UE intends to request at least one of a PDN connection using an APN other than the default APN, handover of an existing PDN connection, and multiple PDN connections.

8. The arrangement of claim 7, wherein the AAA Proxy includes the indication in an EAP message sent to the UE.

9. The arrangement of claim 7, wherein the AAA proxy includes the indication in an AAA message sent with an EAP message to the AAA server, and the AAA server includes the indication in an EAP message sent to the UE.

10. The arrangement of claim 6, wherein the trusted non-cellular access network is a Trusted Wireless Local Area Network Access Network (TWAN).

11. A non-transitory computer-readable medium having instructions that, when executed by a computer, cause the computer to carry out a method of operating a trusted non-cellular access network with a cellular access network, wherein the trusted non-cellular access network includes a trusted non-cellular access network entity; the cellular access network includes a packet data network (PDN) gateway (GW) and a cellular authentication, authorization, and accounting (AAA) server; and a user equipment (UE) that supports multiple PDN connections, each PDN connection using an access point name (APN) other than a default APN, and handover of an existing PDN connection; and the method comprises:
sending, from the trusted non-cellular access network entity to the UE, an indication whether the trusted non-cellular access network supports at least one of a PDN connection using an APN other than the default APN, and handover of an existing PDN connection,
wherein the trusted non-cellular access network entity is a AAA Proxy, the indication is sent during an extensible authentication protocol (EAP) authentication procedure; and if the UE does not receive the indication and if the UE prefers at least one of a PDN connection using an APN other than the default APN, handover of an existing PDN connection, and multiple PDN connections, the UE chooses either to abort the EAP authentication procedure, or to complete the EAP authentication procedure and ignore the UE's preference for at least one of a PDN connection using an APN other than the default APN, handover of an existing PDN connection, and multiple PDN connections.

12. The non-transitory medium of claim 11, wherein the trusted non-cellular access network entity is a AAA Proxy, the indication is sent during an extensible authentication protocol (EAP) authentication procedure, and if the UE does not receive the indication and if the UE intends to request at least one of a PDN connection using an APN other than the default APN, handover of an existing PDN connection, and multiple PDN connections, the UE aborts the EAP authentication procedure.

13. The non-transitory medium of claim 12, wherein the AAA Proxy includes the indication in an EAP message sent to the UE.

14. The non-transitory medium of claim 12, wherein the AAA proxy includes the indication in an AAA message sent with an EAP message to the AAA server, and the AAA server includes the indication in an EAP message sent to the UE.

15. The non-transitory medium of claim 11, wherein the trusted non-cellular access network is a Trusted Wireless Local Area Network Access Network (TWAN).

* * * * *

UNITED STATES PATENT AND TRADEMARK OFFICE
CERTIFICATE OF CORRECTION

PATENT NO. : 9,526,119 B2
APPLICATION NO. : 13/532317
DATED : December 20, 2016
INVENTOR(S) : Sedlacek et al.

It is certified that error appears in the above-identified patent and that said Letters Patent is hereby corrected as shown below:

In the Specification

Column 1, Line 54, delete "(CPRS)" and insert -- (GPRS) --, therefor.

Column 2, Line 26, delete "PDN gateway (GW)," and insert -- PDN gateway (PGW), --, therefor.

Column 6, Line 20, delete "2B." and insert -- 2B; --, therefor.

Column 8, Line 49, delete "Non-GPP" and insert -- Non-3GPP --, therefor.

In the Claims

Column 12, Line 18, Claim 12, delete "non-transitory" and insert
-- non-transitory computer-readable --, therefor.

Column 12, Line 27, Claim 13, delete "non-transitory" and insert
-- non-transitory computer-readable --, therefor.

Column 12, Line 30, Claim 14, delete "non-transitory" and insert
-- non-transitory computer-readable --, therefor.

Column 12, Line 35, Claim 15, delete "non-transitory" and insert
-- non-transitory computer-readable --, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*